MYERS & COHENOUR.
Corn-Planter.
No. {1,164 / 32,168.}  Patented Apr. 23, 1861.
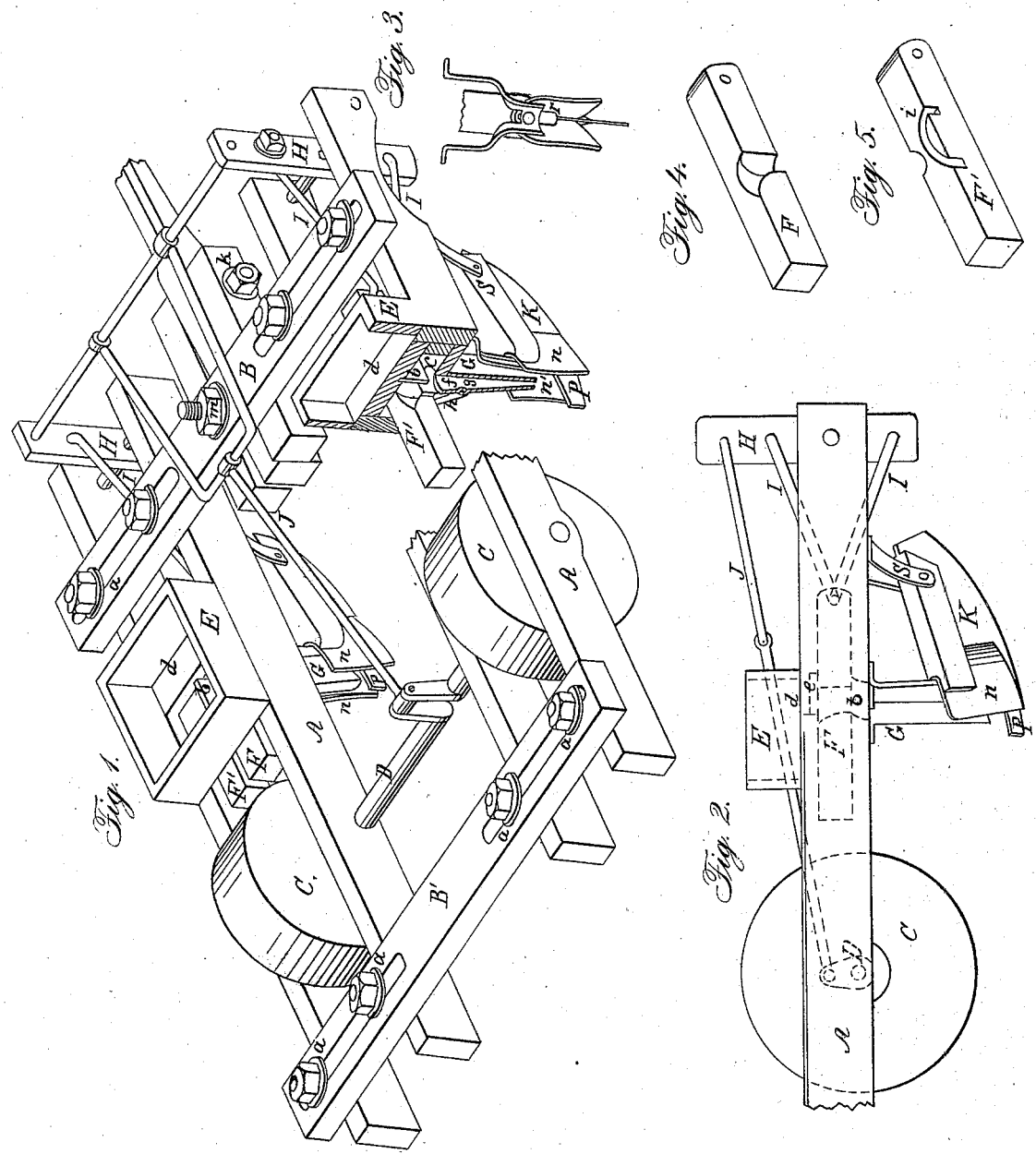
Witnesses:
L. W. Bendré
Octavius Knight
Inventor:
C. K. Myers
J. Cohenour
Jn. Knight Bros
Attys

UNITED STATES PATENT OFFICE.

CHARLES K. MYERS, OF PEKIN, ILLINOIS, ASSIGNOR TO HIMSELF AND JOHN COHENOUR, OF SAME PLACE.

IMPROVEMENT IN CORN-PLANTERS.

Specification forming part of Letters Patent No. 32,168, dated April 23, 1861.

*To all whom it may concern:*

Be it known that I, CHARLES K. MYERS, of Pekin, Tazewell county, Illinois, have invented certain new and useful Improvements in Corn-Planters; and I do hereby declare the following to be a full, clear, and exact description thereof, reference being had to the accompanying drawings, making part of this specification.

In the accompanying drawings, Figure 1 is an isometrical perspective view of a machine embodying my improvement. Fig. 2 is a part of elevation of the same. Fig. 3 is a view showing the adjustability of the colter. Fig. 4 is a perspective top view of one of seed-cavity slides. Fig. 5 being an under side view of the same.

A A' are the frames to which the two seed-dropping tubes and mechanism are attached. They are connected, as shown, to the adjustable transverse bars B B', the nuts *a a* giving means for adjusting and securing the seed-droppers to work different widths apart. The whole frame is mounted on the ground-wheels C C', provided with a crank-axle, D, the crank being used to operate the seed-dropping slides. E are the hoppers, each of which is provided at the bottom with two slides, F F', each slide having a semicircular cavity or duct in its side. The cavities or ducts are scooped out on the inside end, as shown, to enable the grain to fill easily. The slides in each hopper are separated by a thin plate, *b;* but both alternately work into a common duct, *c*, leading to conveying-tube G. The scraper *d*, under which each slide works before discharging its grain, is provided on its under side with a brush, *e*. The conveying-tube G is provided with a mouth-piece or valve, *g*, hinged at *f*, and operated to open and close the mouth of tube G by means of arm *h*, working in a semicircular groove, *i*, in one of the slides. The slides F F' are operated by arms H and rods I I, attached, as shown, through rod J, to the crank of the ground-wheel axle. The position of the tongue in reference to the horizontal plane is adjustable by means of hinge *k* and nut *m* to cause the machine to assume different working depths in the ground. The colter K, fixed in line and under seed-tube G, is provided with wings *n n'* and center tongue, *p*, and is altogether adjustable by means of screw and slot *r* and hinge *s* to plant any desired depth. The tongue *p* prevents the corn from falling to the bottom of the groove made by the wings *n n* until it is covered by the dirt from ends of wings *n n'* and also acts to somewhat scatter the corn in the hill. The chief use of the valve *g* is to bring the point of delivery of the seed as near as possible to the point of deposit, so that the seed may be deposited as nearly as possible the same distance apart. The seed-tube G is protected, as shown, from the crowding action of the dirt by the wings of the colter.

I claim as new and of my invention—

The arrangement of bars B B', colter K *s n n' p*, and discharging mechanism *f g h i*, the whole being constructed and operating in the manner described.

In testimony of which invention I hereunto set my hand.

CHARLES K. MYERS.

Witnesses:
JOHN COHENOUR,
WM. B. PARKER.